United States Patent Office.

HENRY BOWER, OF PHILADELPHIA, PENNSYLVANIA.

MANUFACTURE OF FERRO-CYANIDE OF POTASSIUM.

SPECIFICATION forming part of Letters Patent No. 312,248, dated February 17, 1885.

Application filed June 6, 1884. (No specimens.)

*To all whom it may concern:*

Be it known that I, HENRY BOWER, of the city and county of Philadelphia, in the State of Pennsylvania, have invented a certain new and useful Improvement in the Manufacture of Ferro-Cyanide of Potassium, of which improvement the following is a specification.

The object of my invention is to so utilize, to a higher degree than heretofore the "cake" or "melt" which is produced in the manufacture of ferro-cyanide of potassium from animal matters in the ordinary manner; and to this end my improvement consists in treating the same with a current of carbonic-acid gas, as hereinafter more fully set forth. The cake or melt which is derived from the action of heat upon nitrogenous animal matters, carbonate of potassium and iron, contains a greater or less percentage of sparingly soluble silicate of potash, which remains after the lixiviation of the cake as a constituent of the residuum of the manufacture, and has heretofore been of but little or no commercial value.

The application of my invention is advantageous both in evolving, as an additional product, the potash contained in the silicate, and in increasing the amount of ferro-cyanide of potassium yielded from the cake by reason of the further lixiviation which is performed in the operation.

To carry out my invention, I take the cake of the ordinary manufacture, either in its original condition or at any desired and convenient stage of its treatment by lixiviation, from its condition as formed in the heated iron pots to its reduction to the state of "black residuum," and pass through or over it while mixed with water a current of carbonic-acid gas. This operation is preferably effected by the employment of a closed agitator, rumbler, or revolver of such construction as to constantly agitate and change the surface of the body of material under treatment, and to maintain it continuously in contact with a fresh supply of carbonic-acid gas. The cake or residuum, as the case may be, is then thrown upon filters or filter-beds, and the soluble matter, included in which is the carbonate of potash derived from the silicate of potash by the decomposition thereof by the carbonic-acid gas, is washed out with water.

The carbonic-acid gas may be supplied from any proper generator, and may be economically obtained from the spent gases of the combustion of anthracite coal in boiler-furnaces, which gases are readily available in chemical works provided with the apparatus necessary for the manufacture of ferro-cyanide of potassium. The gas under such circumstances is comparatively weak, being mixed to a large extent with atmospheric air, and the cake or residuum will therefore require a longer treatment therewith than if pure carbonic acid be applied. The degree of strength of the gas, the duration of its application, and the stage of the lixiviation of the cake at which it is subjected to the action of the gas may be varied in the discretion of the operator without departing from the spirit of my invention.

It will be seen that the agitation of the cake, whether fresh, partially washed, or reduced to residuum while being subjected to the action of the gas, as above specified, involves a lixiviation additional to that which it receives in the manufacture as ordinarily practiced, the advantageous effect of which is to increase the yield of ferro-cyanide derived therefrom. It will be further obvious to those skilled in the manufacture that inasmuch as the required washing of the cake is equally facilitated by its treatment with the gas in any condition in which it may be after its original production, the action of the gas may be exerted either upon the fresh cake, the cake when partially washed, or the residuum, at the convenience and option of the manufacturer.

I claim as my invention and desire to secure by Letters Patent—

The improvement in the manufacture of ferro-cyanide of potassium, which consists in mixing nitrogenous animal matters, potassium carbonate and iron, heating the mixture, and treating the resultant cake or melt with water and carbon dioxide, substantially as set forth.

HENRY BOWER.

Witnesses:
   H. F. REARDON,
   W. H. ARROTT.